(12) United States Patent
Mills

(10) Patent No.: US 8,935,928 B2
(45) Date of Patent: Jan. 20, 2015

(54) INTEGRATED AIR-CYCLE REFRIGERATION AND POWER GENERATION SYSTEM

(75) Inventor: Frank Mills, Altadena, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 491 days.

(21) Appl. No.: 13/270,180

(22) Filed: Oct. 10, 2011

(65) Prior Publication Data

US 2013/0086927 A1    Apr. 11, 2013

(51) Int. Cl.
*F25D 3/12*    (2006.01)
*F25B 27/00*    (2006.01)

(52) U.S. Cl.
CPC ..................... *F25B 27/00* (2013.01)
USPC .................. 62/56; 62/500; 62/510

(58) Field of Classification Search
USPC ............ 62/56, 86, 238.1, 401, 434, 500, 501, 62/510
See application file for complete search history.

(56) References Cited

U.S. PATENT DOCUMENTS

| | | | |
|---|---|---|---|
| 3,696,637 A * | 10/1972 | Ness et al. ...................... | 62/402 |
| 4,730,464 A * | 3/1988 | Lotz .................................. | 62/401 |
| 5,442,905 A | 8/1995 | Claeys et al. | |
| 5,524,442 A * | 6/1996 | Bergman et al. .................. | 62/86 |
| 5,860,283 A | 1/1999 | Coleman et al. | |
| 6,925,818 B1 * | 8/2005 | Brown .............................. | 62/86 |
| 2004/0051002 A1 | 3/2004 | Sampson | |
| 2006/0162371 A1 | 7/2006 | Lui et al. | |
| 2011/0005244 A1 | 1/2011 | Finney et al. | |

FOREIGN PATENT DOCUMENTS

| | | |
|---|---|---|
| EP | 1609718 | 12/2005 |
| EP | 2169197 | 3/2010 |

OTHER PUBLICATIONS

Ordonez et al., "Minimum power requirement for environmental control of aircraft", Energy, 2003, pp. 1183-1202, vol. 28.
Swift, "Preliminary Design for a Reverse Brayton Cycle Cryogenic Cooler", NASA Contract NAS5-31281, Dec. 10, 1993.

* cited by examiner

*Primary Examiner* — Melvin Jones
(74) *Attorney, Agent, or Firm* — McDermott Will & Emery LLP

(57) ABSTRACT

An integrated power and refrigeration system is disclosed that includes a first subsystem configured to provide cooling air using a reverse-Brayton cycle using compressed air and a second subsystem configured to provide power by accepting a first portion of the compressed air from the first subsystem, heating the accepted first portion of the compressed air to form hot compressed air, and using the hot compressed air to drive a turbine that is coupled to a power generator.

16 Claims, 5 Drawing Sheets

INTEGRATED AIR-CYCLE REFRIGERATION AND POWER GENERATION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field

The present disclosure generally relates to systems and methods of generating refrigeration and power and, in particular, mobile systems that use waste heat to improve the performance of refrigeration and power generation systems.

2. Description of the Related Art

An open-cycle gas turbine based on the Brayton cycle is one traditional method of generating power. Fresh air is compressed in a compressor and provided to a combustion chamber wherein combustion of a fuel increases the temperature of the gas. The hot high-pressure gas from the combustion chamber is provided to a turbine that is coupled to both the compressor and to an electrical generator, wherein work extracted from the hot compressed gas in the turbine drives the compressor and the power generator. The gas exiting the turbine is then exhausted to the environment. Another approach used on aircraft to provide electrical power uses a generator driven by one of the propulsion engines.

Some traditional approaches to providing refrigeration on aircraft use a reverse Brayton cycle system wherein bleed air from the aircraft engine is compressed in a compressor, then cooled, and then expanded in a turbine that drives the compressor, with the cooled exhaust air from the turbine provided as cooling air to either the cabin or on-board equipment. Other systems include a power generator coupled to the turbine of the reverse Brayton cycle system to generate electrical power. Such a system is disclosed in U.S. Pat. No. 5,442,905 to Claeys et al. wherein the power turbine is driven by bleed air from an aircraft's engine. The relatively low energy content of the bleed air limits the amount of power that can be generated.

SUMMARY

There is a need to provide both power and refrigeration on aircraft as well as a growing interest in converting aircraft waste heat, e.g. heat dissipated within the engine or the exhaust gas from the engine, into useable power. Conversion of such "low-grade" heat into power can be inherently inefficient if the size and weight of the power generation system is low.

The disclosed systems and methods provide power and/or refrigeration using systems at least partially driven by on-board heat sources such as waste heat from a propulsion engine.

In certain embodiments, an integrated power and refrigeration system is disclosed that includes a first subsystem configured to provide cooling air using a reverse-Brayton cycle using compressed air and a second subsystem configured to provide power by accepting a first portion of the compressed air from the first subsystem, heating the accepted first portion of the compressed air to form hot compressed air, and using the hot compressed air to drive a turbine that is coupled to a power generator.

In certain embodiments, an integrated power and refrigeration system is disclosed that includes a first compressor configured to accept a first stream of air, compress the first air stream, and provide a compressed air stream. The integrated system also includes a second compressor configured to accept a first portion of the compressed air stream from the first compressor, further compress the accepted first portion of the compressed air stream, and provide a highly compressed air stream. The integrated system also includes a first heat exchanger coupled to a cooling medium. The first heat exchanger is configured to accept a second portion of the compressed air stream, cool the accepted second portion of the compressed air stream by rejecting heat to the cooling medium, and provide a cool compressed air stream. The integrated system also includes a second heat exchanger coupled to an engine. The second heat exchanger is configured to accept the highly compressed air stream, heat the accepted highly compressed air stream using heat extracted from the engine, and provide a hot highly compressed air stream. The integrated system also includes a generator configured to provide power and a power turbine coupled to the generator and the first and second compressors. The power turbine is configured to accept the hot highly compressed air, expand and extract work from the hot highly compressed air thereby driving the generator and the first and second compressors. The integrated system also includes a cooling turbine configured to accept the cool compressed air stream, expand the cool compressed air stream thereby decreasing the temperature and pressure of the cool compressed air stream, and exhaust a cold near-ambient pressure air stream to a cooling load.

In certain embodiments, a power system is disclosed that includes a first compressor configured to accept a first stream of air, compress the first air stream, and provide a compressed air stream. The power system also includes a heat exchanger coupled to an engine. The first heat exchanger is configured to accept the compressed air stream, heat the compressed air stream using heat extracted from the engine, and provide a hot compressed air stream. The power system also includes a generator configured to generate electrical power and a power turbine coupled to the generator and the first compressor. The power turbine is configured to accept the hot compressed air stream, expand and extract work from the hot compressed air stream thereby driving the generator and the first compressor, and exhaust an expanded air stream to an external environment.

In certain embodiments, a method of providing power on an aircraft having a propulsive engine is disclosed. The method includes the steps of compressing a stream of air to form a compressed air stream, heating the compressed air stream using heat extracted from the engine to form a hot compressed air stream, and expanding the hot compressed air stream in a turbine that is coupled to a power generator.

In certain embodiments, a method of providing refrigeration on an aircraft having a propulsive engine is disclosed. The method includes the steps of compressing with a compressor a stream of air to form a compressed air stream, heating a first portion of the compressed air stream using heat extracted from the engine to form a hot compressed air stream, and cooling a second portion of the compressed air stream by rejecting heat to ambient air external to the aircraft to form a cool compressed air stream. The method also includes the step of expanding and extracting work from the hot compressed air stream in a turbine that is coupled to the compressor thereby driving the compressor, then expelling the expanded air stream from the aircraft. The method also includes the step of expanding the cool compressed air stream to form a cold near-ambient pressure air stream and providing the cold near-ambient pressure air stream to a cooling load.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
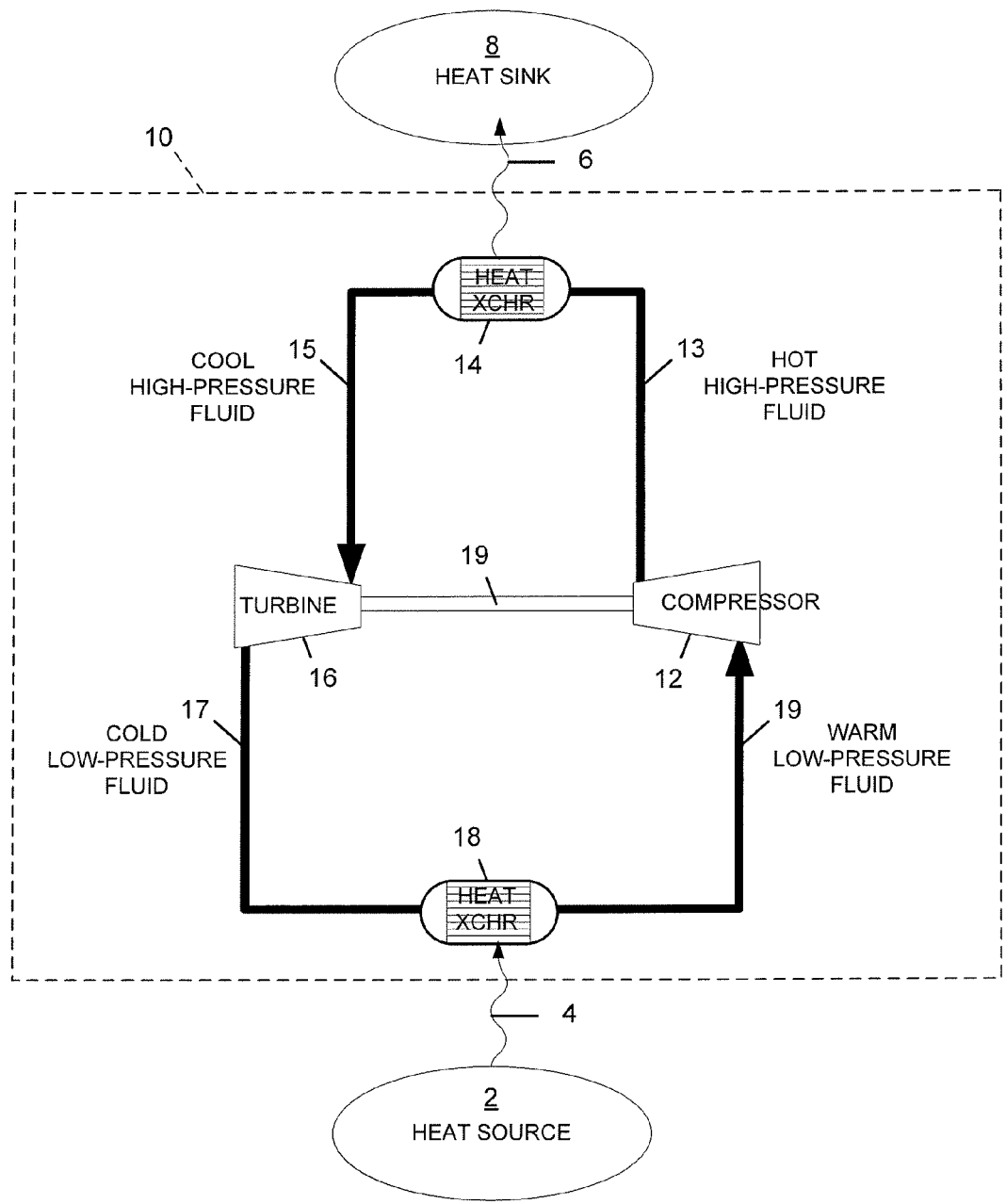
FIG. 1 is a schematic of an example cooling system using a reverse Brayton cycle.

The following description discloses embodiments of systems and methods of utilizing heat from an on-board heat source, such as waste heat from a propulsion engine, to provide one or both of power and refrigeration. In certain embodiments, the power and refrigeration systems are cooperatively coupled together to generate both power and refrigeration from a common source of air. In certain embodiments, cooling is provided by ambient air from the external environment flowing through a heat exchanger and then being exhausted to the external environment. In certain embodiments, the propulsion engine incorporates one or more cooling channels through the casing that function as a heat exchanger to heat the compressed air that is then used to drive a turbine.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

The exemplary methods and systems disclosed herein are presented in terms of an aircraft propelled by a turbojet engine. The disclosed methods and systems may also be used for other mobile systems, for example a train or truck having an on-board heat source, as well as stationary systems where it is advantageous to utilize available waste heat to provide either or both of power and refrigeration. Nothing in this disclose, unless expressed stated as such, limits the application of the disclosed systems or methods to jet-propelled aircraft.

Within this disclosure, reference indicators may be attached to fluid lines in schematic diagrams, wherein the reference indicator may refer to the line itself, the fluid contained in that line, or to a flow or stream of fluid passing through the line. As the pressure and temperature of the fluid within a line between components are essentially constant, a reference to any of these aspects of the reference indicator is considered to be an interchangeable reference to the other aspects. For example, the phrases "the compressed air 42B," "the compressed air stream 42B," "air flow 42B," and "the air in line 42B" are to be considered interchangeable.

Within this disclosure, the phrase "a highly compressed air stream" indicates only that the pressure of the air is greater than that of the air in "a compressed air stream" that is itself an indication that the pressure is greater than that of the air in "an air stream." There is no implication of the amount of the difference in pressure between "highly compressed" and "compressed," only that "highly compressed" is greater than "compressed."

Within this disclosure, the phrase "a hot compressed air stream" indicates only that the temperature of the air is greater than that of the air in "a compressed air stream." There is no implication of the amount of the difference in temperature between a "hot" material and a material that lacks the adjective "hot," only that the temperature of the "hot" material is greater than the temperature of the material that lacks the adjective "hot."

Similarly, within this disclosure the phrase "cold compressed air" indicates only that the temperature of the air is less than that of "cool compressed air" that is itself an indication that the temperature is less than that of "compressed air" that lacks a temperature-related adjective. There is no implication of the amount of the difference in temperature between a "cold" material and a "cool" material, only that the temperature of the "cold" material is less than the temperature of the "cool" material, and likewise for a "cool" material compared to a material lacking a temperature-related adjective.

FIG. 1 is a schematic of an example cooling system 10 using a reverse Brayton cycle. In this system, a compressor 12 is connected to a turbine 16 via a shaft 19. Beginning at the lower right corner of the loop, warm low-pressure fluid 19 enters the compressor 12 and is thereby compressed to a higher pressure and a hot high-pressure fluid 13 is expelled from the compressor 12. This hot high-pressure fluid 13 enters a heat exchanger 14 which rejects a certain amount of heat 6 to a heat sink 8 that is coupled to the heat exchanger 14. After passing through the heat exchanger 14, the fluid is now a cool high-pressure fluid 15 at essentially the same pressure as the hot high-pressure fluid 13 that entered the heat exchanger 14. This cool high-pressure fluid 15 enters turbine 16 and is therein expanded as work is extracted from the cool high-pressure fluid 15 thereby rotating the shaft 18 and driving the compressor 12 attached thereto. The fluid exits turbine 16 as a cold low-pressure fluid 17 that is, in this example, passed to a heat exchanger 18 that is coupled to a heat source 2. The heat exchanger extracts heat 4 from the heat source 2 thereby warming the cold low-pressure fluid 17 and expelling a warm low-pressure fluid 19. The cycle of FIG. 1 is a closed-loop cycle, wherein the fluid exiting the heat exchanger 18 is the source of the fluid provided to the compressor 12. Other embodiments of cooling systems may be configured as open-loop systems wherein the warm low-pressure fluid 19 is drawn in from an external source, such as air from the ambient environment, and the cold low-pressure fluid 17 is provided as refrigerated air into the passenger compartment of an aircraft and then eventually exhausted to the environment.

Figure 2:
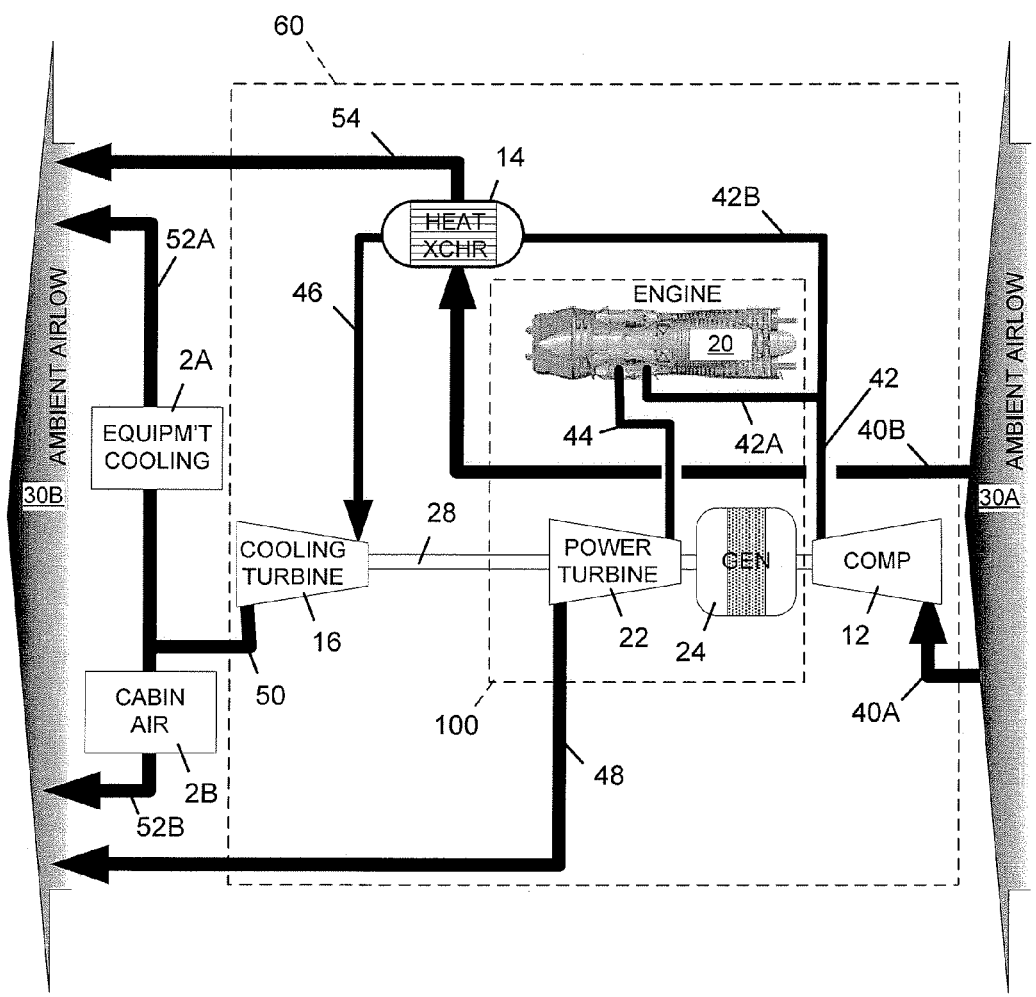
FIG. 2 is a schematic diagram of an exemplary embodiment of an integrated power and refrigeration system on a turbojet-driven aircraft according to certain aspects of this disclosure.

FIG. 2 is a schematic diagram of an exemplary embodiment of an integrated power and refrigeration system 60 on a turbojet driven aircraft (not shown) according to certain aspects of this disclosure. In the diagram, there is a first subsystem, indicated by the dashed line box labeled '60' excluding the dashed-line box labeled '100,' configured as an open-loop reverse Brayton cycle system comprising a cooling turbine 16, a heat exchanger 14, and a compressor 12. In certain embodiments, the cooling turbine 16 and the compressor 12 are both coupled to a shaft 28 such that work extracted in the cooling turbine 16 rotates the shaft 28 and thereby drives the compressor 12. The reverse Brayton cycle uses air as the working fluid and comprises compressed air during a portion of the cycle.

There is a second subsystem 100 comprising a second heat exchanger (not visible in FIG. 2) located within the engine 20, a power turbine 22 and a generator 24. In certain embodiments, the power turbine 22 and generator 24 are both coupled to the shaft 28. In certain embodiments, the cooling turbine 16 is not coupled to the shaft 28 and the power turbine 22 provides all of the driving power to the generator 24 and compressor 12.

In the embodiment of FIG. 2, air enters from the ambient environment 30A, such as from a ram air scoop on an external surface of the aircraft, into compressor 12 wherein the air is compressed and provided as a compressed air stream 42 that separates into two portions 42A and 42B. The first portion 42A enters the second subsystem 100 and is passed through a heat exchanger that, in this embodiment, consist of at least one cooling channel (not visible in FIG. 1) in the structure of engine 20. Some of the heat generated by the combustion process within the engine 20 transfers into the engine structure and therethrough into the compressed air 42A that is passing through the cooling channel. This transferred heat raises the temperature of the compressed air 42A such that a stream of hot compressed air 44 leaves the engine 20. This hot compressed air 44 enters power turbine 22 wherein work is extracted from the incoming hot compressed air 44 by expansion of the hot compressed air within the turbine 22 as is known to those of skill in the art. The expanded air 48 is expelled from power turbine 22 and, in this embodiment, expelled to the ambient environment 30B. In certain embodiments, ambient environments 30A and 30B are the inlet and outlet of an air duct of the aircraft.

The second portion 42B of the compressed air flow exiting compressor 12 remains in the first subsystem and is directed to a heat exchanger 14. The heat exchanger 14 also accepts a second incoming air flow 40B from the ambient environment 30A as a cooling medium and passes this through separate channels within the heat exchanger 14. In certain embodiments, one or more of the incoming air flows 40A and 40B are fan air received from the engine 20. Heat is transferred from the compressed air 42B to the relatively cool ambient air 40B within the heat exchanger 14, thereby forming cool compressed air 46. The warmed cooling media 54 is expelled to the ambient environment 30B. The cool compressed air 46 exits heat exchanger 14 and passes to cooling turbine 16 wherein the cool compressed air 46 is expanded and cooled and exits the cooling turbine 16 as cold near-ambient pressure air stream 50. The cold near-ambient pressure air 50 is provided by the cooling compressor 16 to a cooling load that, in this embodiment comprises an equipment cooling load 2A and as cabin air 2B to provide cooling and fresh air for the cabin of the aircraft. In this embodiment, the air from these cooling loads 2A and 2B are expelled to the ambient environment as exhaust streams 52A and 52B, respectively. The combination of the equipment cooling load 2A and cabin air 2B forms a cooling load on the system 60.

It can be seen that both the expansion of air in cooling turbine 16 and in power turbine 22 will both provide driving power to operate the generator 24 as well as the compressor 12. The primary purpose of the power turbine 22 is to provide power while the power extracted from the cooling turbine 16 is an adjunct to its cooling function. In some embodiments, the cooling turbine 16 is not coupled to the shaft 28 and the power turbine 22 provides all the power to drive the system 60.

Figure 3:
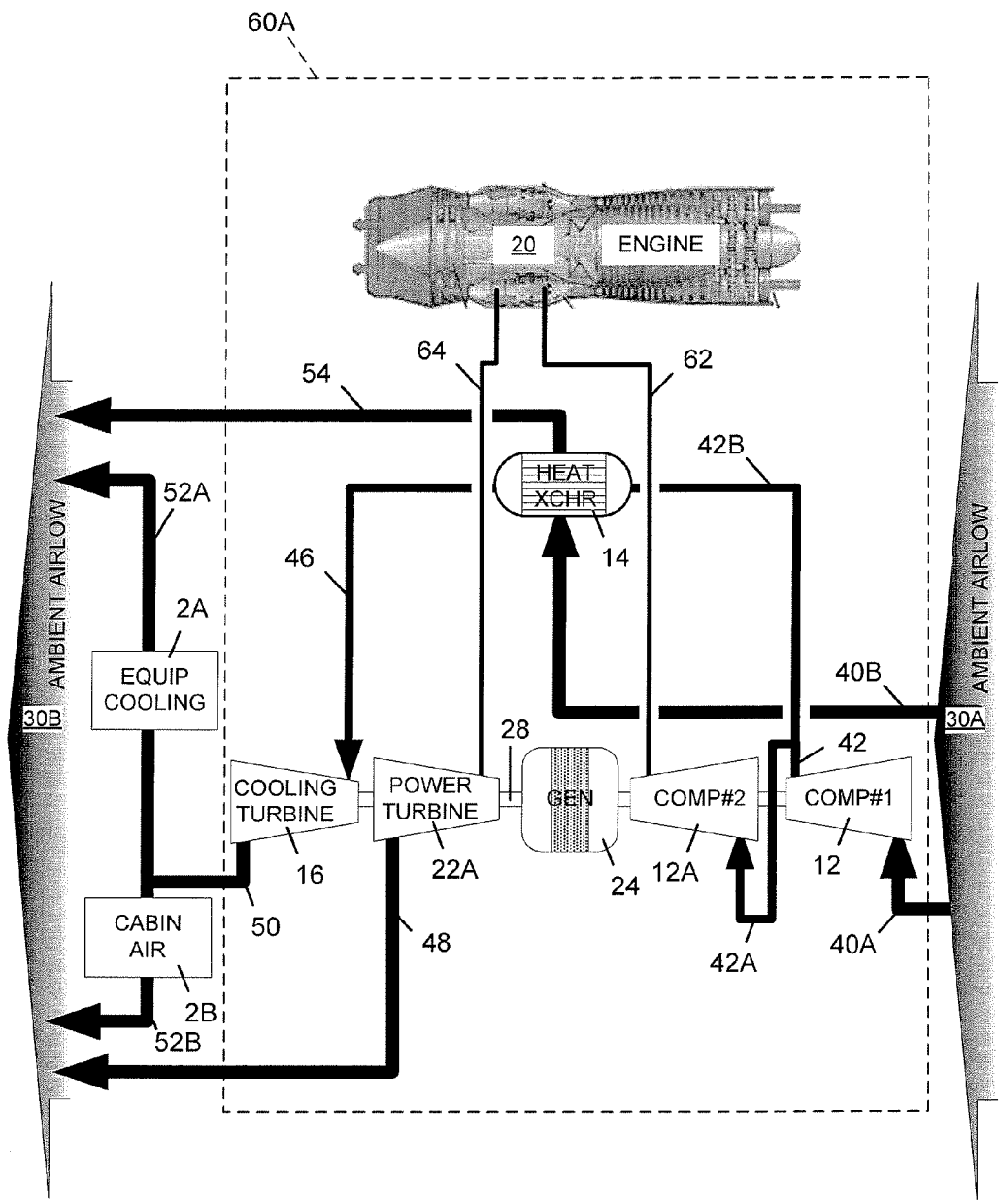
FIG. 3 is a schematic diagram of another embodiment of an integrated cooling and power generation system according to certain aspects of this disclosure.

FIG. 3 is a schematic diagram of another embodiment 60A of an integrated cooling and power generation system according to certain aspects of this disclosure. In this embodiment, a second compressor 12A has been added to the system 60A and is also mounted to shaft 28. The first portion 42A of the compressed air 42 is now passed from compressor 12 to compressor 12A where the compressed air 42A is further compressed and exits compressor 12A as a highly compressed air stream 62. After passing through the at least one cooling channel of engine 20, the air exits as a hot highly compressed air stream 64 that passes to power turbine 22A, which is configured to accept a lower flow rate of air at a higher pressure than power turbine 22 of FIG. 2. Power turbine 22A expands and extracts work from the hot highly compressed air 64 thereby driving the generator and the first and second compressors 12, 12A and then exhausts the expanded air 48 to the external ambient environment 30B.

Figure 4:
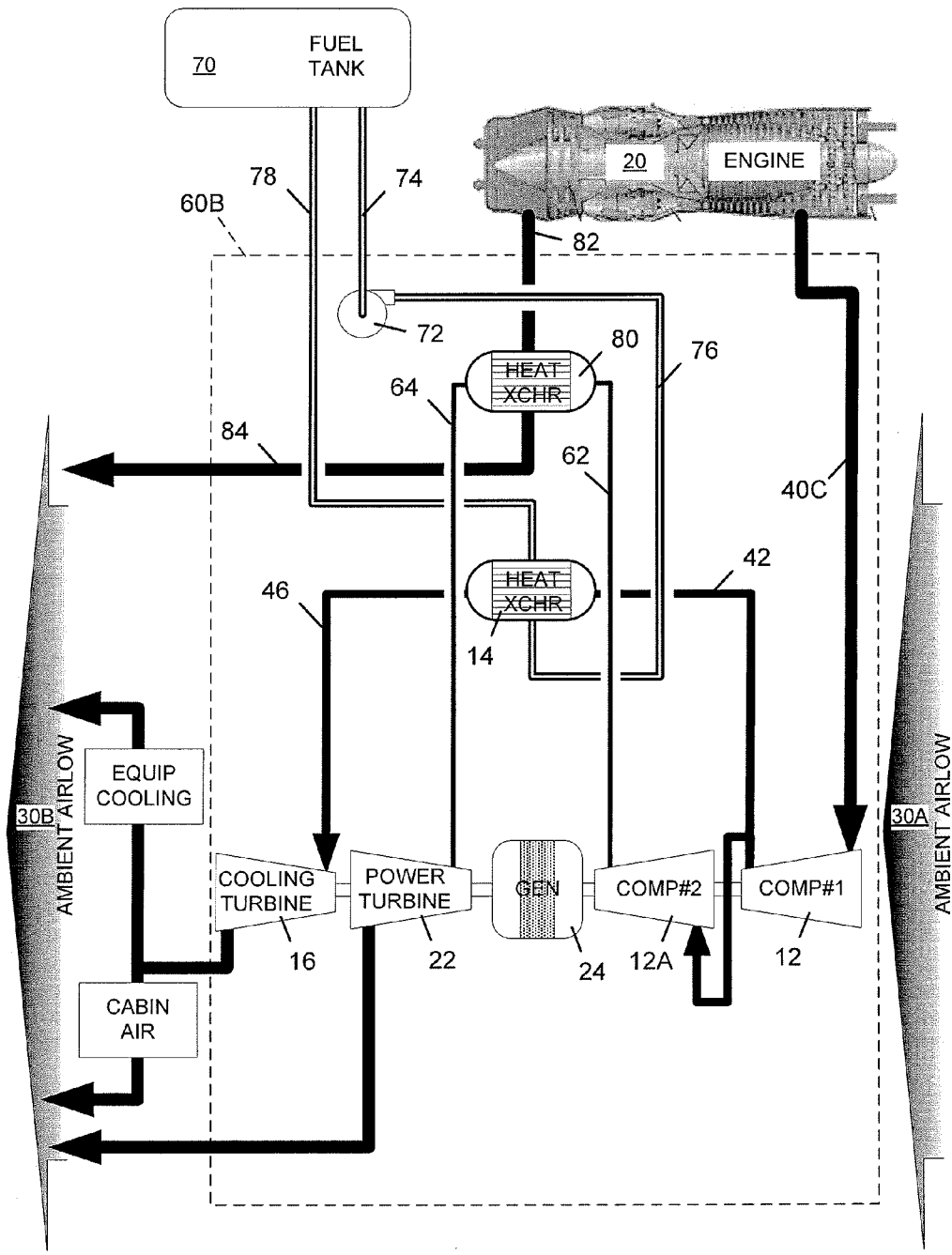
FIG. 4 is a schematic diagram of another embodiment of a integrated power and refrigeration system according to certain aspects of this disclosure.

FIG. 4 is a schematic diagram of another embodiment 60B of a integrated power and refrigeration system according to certain aspects of this disclosure. In this embodiment, compressor 12 accepts bleed air 40C from engine 20 instead of accepting air directly from the ambient environment 30A. This bleed air 40C has already been compressed by the initial compressor fans of engine 20 but is otherwise uncontaminated by fuel or other elements. Use of bleed air 40C may reduce the load on compressor 12 at the cost of additional load on the engine 20. In certain embodiments, the air received by the compressor 12 is drawn from other sources such as engines other than turbojets or cabin air exhaust.

Another difference between this embodiment 60B and embodiment 60 is that the cooling medium used by the heat exchanger 14 is liquid fuel, wherein fuel 74 from fuel tank 70 is provided to a circulating pump 72 which passes the cool fuel 76 to the heat exchanger 14 and then the warmed fuel, in this embodiment, returns through line 78 back to the fuel tank 70. This provision allows the fuel in the system to be used as a coolant wherein the heat absorbed by the fuel is dissipated within the tank 70. In certain embodiments, the fuel 78 is directed to the engine 20 or other combustion device on the aircraft. In certain embodiments, the use of fuel as a cooling medium in place of external air 40B, as shown in FIG. 3, may allow for a simpler and lower-weight refrigeration system.

Another difference between this system 60B and the previous system 60 is that the heat from the engine 20 is extracted in an external heat exchanger 80 where the highly compressed air 62 is heated within heat exchanger 80 by a flow of exhaust air 82 that is tapped off the engine 20. After passing through heat exchanger 80, the cooled exhaust air 84 is exhausted to the ambient environment 30B. Use of an external heat exchanger 80 may allow for an improved aircraft configuration rather than having to pass the highly compressed air 62 all the way to the engine 20 and then return it to the power turbine 22. The flow of the compressed air 42 from compressor 12 through heat exchanger 14 and then as cool compressed air 46 to the cooling turbine 16 is as previously presented in FIG. 3.

It will be obvious to those of skill in the art that the various differences in the systems 60, 60A, and 60B can be separably employed and in various combinations beyond those provided in the example embodiments of FIGS. 2-4. For example, the use of bleed air 40C can be added to the embodiment of FIG. 3 without requiring the incorporation of the use of fuel as a cooling medium for heat exchanger 14. In addition, other sources of waste heat, such as the exhaust of an on-board oven (not shown), may be used as a heat source for heat exchanger 80.

Figure 5:
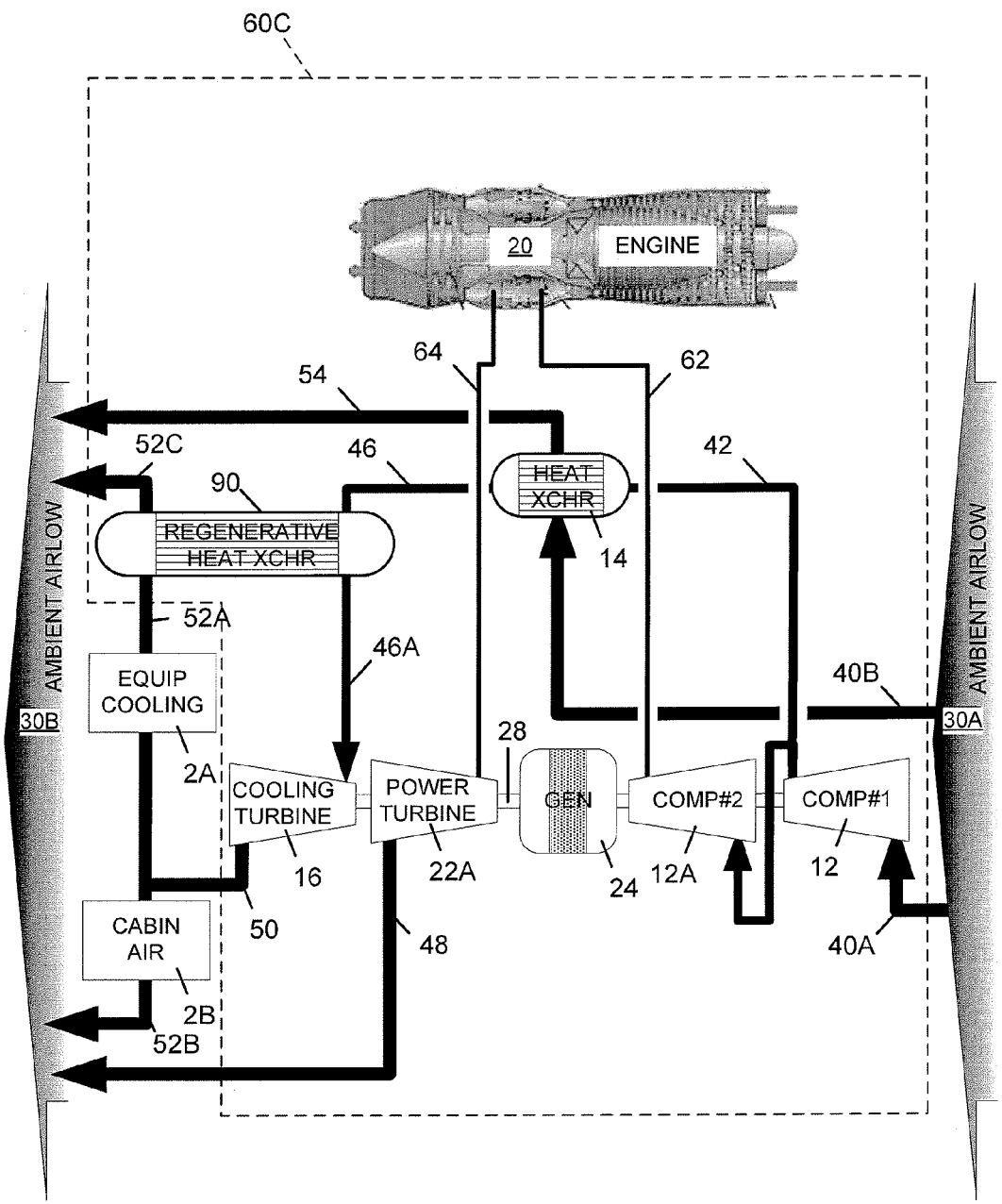
FIG. 5 is a schematic diagram of another embodiment of an integrated power and refrigeration system according to certain aspects of this disclosure.

FIG. 5 is a schematic diagram of another embodiment 60C of an integrated power and refrigeration system according to certain aspects of this disclosure. In this embodiment, a regenerative heat exchanger 90 has been added to the first subsystem of system 60C whereby the cool compressed air 46 that exits heat exchanger 14 passes through the regenerative heat exchanger 90 while at least a portion of the cold near-ambient pressure air 52A that has passed through equipment cooling load 2A then passes through the regenerative heat exchanger 90. If the near-ambient pressure air 52A is colder than the cool compressed air 46, heat will be transferred within the regenerative heat exchanger 90 thereby further cooling the cool compressed air 46 to form cold compressed air stream 46A. The use of regenerative heat exchanger 90 may provide additional cooling capability and recapture of some of the heat sink capacity still inherent in the flow 52A before it is exhausted to the ambient airflow 34B. This system otherwise is similar to systems previously presented.

It will be obvious to those of skill in the art that the various features shown in the embodiments of FIGS. 3 through 5 can be combined in other combinations not presented explicitly within this disclosure, but are compatible combinations of the features presented herein. The compressor 12A may provide improved energy efficiency and allow the use of a higher air pressure to drive the power turbine 22 rather than relying on the pressure of the compressed air 42 to drive both the power turbine 22 and the cooling turbine 16. The use of other elements, for example the regenerative heat exchanger 90, will be based on a comparison of the cost and weight of including the equipment compared to the benefits achieved by the use of that component in the integrated system.

It will be obvious to those of skill in the art that portions of the system can be used alone to provide a portion of the benefits of any of the embodiments of the integrated system 60. For example, the power subsystem 100 of FIG. 2 can be combined with the compressor 12 and used to generate power without providing refrigeration. Likewise, the heat exchanger 80 and power turbine 22 can be combined with the refrigeration subsystem of FIG. 2 to create a system that may offer improved efficiency in providing refrigeration.

The concepts disclosed herein use air as a working fluid for both a power-generating Brayton cycle subsystem and a reverse Brayton refrigeration cycle subsystem. The air may be drawn in from the external ambient environment or accepted from another source of air, such as the compression stage of a turbojet engine. Heat for the reverse Brayton cycle is provided by waste heat from on-board heat sources such as a propulsion engine. The integration of the compression stage of the power and refrigeration subsystems may allow for reductions in system weight and complexity or improvements in reliability. Use of air as the working fluid reduces the hazard of system leakage as well as allowing the air to be expelled after use to the ambient external environment without risk of pollution. The open-loop system design eliminates the need for a heat exchanger and an additional heat sink to cool that would be required in a close-loop system.

The previous description is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:
1. An integrated power and refrigeration system comprising:
a first subsystem configured to provide cooling air using a reverse-Brayton cycle, the first subsystem comprising:
a first compressor configured to provide compressed air, a first heat exchanger configured to accept a first portion of the compressed air and provide cool compressed air, and a cooling turbine configured to accept the cool compressed air, expand the cool compressed air to further cool the cool compressed air to form cold near-ambient pressure air, and exhaust the cold near-ambient pressure air to a cooling load; and a second subsystem configured to provide power by accepting a second portion of the compressed air from the first subsystem, heating the accepted second portion of the compressed air to form hot compressed air, and using the hot compressed air to drive a turbine that is coupled to a power generator.

2. The system of claim 1, wherein:

the first compressor is further configured to accept a first flow of air, and compress the first flow of air to form the compressed air; and the first heat exchanger is coupled to a cooling medium, and is further configured to cool the accepted first portion of the compressed air by rejecting heat to the cooling medium to form the cool compressed air.

3. The system of claim 2, wherein the first compressor is configured to accept air from an external environment.

4. The system of claim 2, wherein the first compressor is configured to accept bleed air from an engine.

5. The system of claim 2, wherein the cooling medium is air from an external environment.

6. The system of claim 2, wherein:

the cooling medium is fuel; and the first heat exchanger comprises an air channel and a fuel channel that are thermally coupled to each other;

the system is configured to allow the first portion of the compressed air to pass through the air channel; and the first heat exchanger is configured to accept a fuel flow from an external fuel system, guide the fuel flow through the fuel channel, and then return the fuel flow to the external fuel system.

7. The system of claim 2, wherein the second subsystem comprises:

a second heat exchanger coupled to a heat source, the second heat exchanger configured to accept the second portion of the compressed air from the first compressor, heat the accepted second portion of compressed air by extracting heat from the heat source to form hot compressed air, and provide the hot compressed air;

a generator configured to provide power; and a power turbine coupled to the generator and the first compressor, the power turbine configured to accept the hot compressed air, expand and extract work from the hot compressed air thereby driving the generator and the first compressor, and exhaust the expanded air to an external environment.

8. The system of claim 6, wherein the heat source is an engine.

9. The system of claim 7, wherein the second heat exchanger comprises a cooling channel through the engine, and the system is configured to allow at least a portion of the compressed air to pass through the cooling channel of the engine.

10. The system of claim 7, wherein:

the second heat exchanger comprises first and second flow channels that are thermally coupled to each other;

the system is configured to allow the second portion of the compressed air to pass through the first flow channel; and the second heat exchanger is configured to accept engine exhaust gas, guide the engine exhaust gas through the second channel, and then exhaust the engine exhaust gas to the external environment.

11. The system of claim 3, wherein the second subsystem further comprises a second compressor coupled to the power turbine, wherein:

the second compressor is configured to accept the second portion of compressed air from the first subsystem, further compress the second portion of the compressed air to form highly compressed air, and provide the highly compressed air;

the second heat exchanger is configured to accept the highly compressed air in place of the compressed air, heat the highly compressed air using heat extracted from the engine to form hot highly compressed air, and provide the hot highly compressed air; and the power turbine is configured to accept the hot highly compressed air, expand and extract work from the hot highly compressed air thereby driving the generator and the first and second compressors.

12. The system of claim 11, wherein the second heat exchanger comprises a cooling channel through the engine, and the system is configured to allow at least a portion of the highly compressed air to pass through the cooling channel of the engine.

13. The system of claim 11, wherein:

the second heat exchanger comprises first and second flow channels that are thermally coupled to each other;

the highly compressed air stream passes through the first flow channel; and the second heat exchanger is configured to accept engine exhaust gas, guide the engine exhaust gas through the second flow channel, and then exhaust the engine exhaust gas to the external environment.

14. The system of claim 2, wherein the first subsystem further comprises a regenerative heat exchanger that comprises third and fourth flow channels that are thermally coupled to each other, wherein:

the regenerative heat exchanger is configured to accept at least a portion of the cold near-ambient pressure air that has passed through the cooling load, guide the accepted portion of the cold near-ambient pressure air through the fifth flow channel, and then exhaust the cold near-ambient pressure air stream to the external environment;

the regenerative heat exchanger is further configured to accept the cool compressed air from the first heat exchanger, guide the cool compressed air through the fifth flow channel thereby further cooling the cool compressed air stream by rejecting heat to the cold near-ambient pressure air stream that is flowing through the fifth flow channel to form cold compressed air, and provide the cold compressed air stream;

the cooling turbine is configured to accept the cold compressed air and expand the cold compressed air thereby decreasing the temperature and pressure of the cold compressed air to form the cold near-ambient pressure air.

15. The system of claim 7, wherein the generator comprises an electric power generator.

16. The system of claim 7, wherein the generator comprises a hydraulic pump.

* * * * *